Patented Oct. 30, 1928.

1,689,456

UNITED STATES PATENT OFFICE.

EMIL SCHÜZ, OF LEIPZIG-GROSSZSCHOCHER, GERMANY, ASSIGNOR TO THE FIRM MEIER & WEICHELT, OF LEIPZIG-LINDENAU, GERMANY.

METALLURGICAL PRODUCT AND PROCESS OF PRODUCING SAME.

No Drawing. Application filed November 3, 1925, Serial No. 66,662, and in Germany May 13, 1924.

My invention refers to a new metallurgical product and to the process of making the same. It more especially refers to the production of grey cast iron of superior quality as compared with similar products hitherto produced.

As is well known to those skilled in the art, iron containing carbon may be in either of two forms, which may be described respectively as the metastable system consisting of iron-iron carbide and the stable system consisting of iron-graphite. In the case of the metastable system, after the separation of the solid solution, the residue freezes at 1145° with over 1.7% of carbon in the form of a solid solution cementite eutectic, (metallographic: Ledeburite) whereas in the stable system after separation of the solid solution, the residue freezes at 1152° and contains 1.3% of carbon in the form of a solid solution eutectic graphite.

In ordinary cast-iron the graphite is fixed as a decomposition product of Ledebur cementite during the solidification, i. e. secondarily derived by way of the metastable system. The process is to be regarded as supercooling inasmuch as the eutectic carbon separates first at 1145° in its metastable form as carbide. Yet during the solidification this carbide breaks down further into solid solution and graphite. This secondary graphite goes into the form of well developed laminæ or veins varying in size and number according to the rate of cooling and the total carbon content of the iron.

There has been a presumption that a stable eutectic phase exists, and later it was shown that it occurred at 1152°. It was not recognized that this form of graphite differed fundamentally from secondary graphite.

Since the separated graphite breaks up the metallic matrix, efforts have been made to increase the tenacity of cast iron by producing as fine a distribution of the graphite as possible. The existing foundry methods were however only able to produce the graphite by way of the metastable system.

The present invention was at least in part initiated by the discovery that in certain rare instances, castings disclosed nests of a eutectic "graphite-ferrite" of accidental occurrence. After many years of exhaustive experiments a method was evolved of conducting the separation of the carbon from the melt without supercooling immediately after 1152° mark.

The eutectic graphite differs fundamentally and metallographically from decomposition graphite. This difference lies in the size of the grain and also in the arrangement of the individual graphite particles. The size of the grain of the eutectic graphite is far smaller than the most finely divided decomposition graphite. Furthermore the eutectic graphite has in contrast to the irregularly distributed decomposition graphite a regular arrangement in the final product. The eutectic graphite is, according to the total carbon content, separated from the primary precipitated solid solution in patches of greater or less size and shows a structure similar to that of pearlite embedded in ferrite in a subeutectic steel.

The eutectic graphite has been found to be especially suited for the production of high quality grey iron, as the free carbon is in an exceedingly fine state of division and a casting of remarkable strength and density is produced.

The grey iron produced according to this invention is characterized by its great strength and also by being extraordinarily easy to work, the tensile strength for example amounting from 30 to 40 kg. per sq. mm. and the bending strength from 50 to 80 kg. per sq. mm. according to the amount of deflection. The casting is steam tight. Since the matrix consists of ferrite and owing to the stability of the eutectic graphite the casting suffers no structural changes nor any permanent alterations of volume when strongly heated, thus rendering it very suitable for high temperature work.

The separation of carbon in this finely divided state is obtained by arranging for a definite relation between the grade of iron and the rate of cooling, so that the pressure exerted on the carbon by ingredients which favour graphite formation (for example silicon, aluminium, nickel, etc.) is greater than the effect of ingredients which retard the formation of graphite (for example manganese, sulphur, chronium, oxygen, etc.). For this purpose a particular rate of cooling during the period of solidification must be selected, according to the grade of the iron used. For example ordinary iron from a cupola furnace having a high silicon content of about 3.5% is cooled at a comparatively high rate such as obtainable by casting in an iron mould (coquille); in this way the eutectic graphite is obtained with the usual foundry appliances. The rate of cooling may be reduced in proportion as the carbon content of the iron is lower. It is difficult in foundry practice to arrange with great precision for a particular relation between the grade of the iron and the rate of cooling, so that accidentally patches of white iron may appear at the edges. This white iron is easily broken up by short heating at about $Ac_1$ when, owing to the pressure of the foreign matter, the cementite is very rapidly decomposed into ferrite and temper carbon. Short heating is often an advantage since it removes all the inner stresses. After thus converting the pearlitic mixed crystals into nodules of temper carbon and ferrite the structure consists exclusively of ferrite, eutectic graphite and traces of temper carbon, the good qualities of the iron remaining unimpaired.

I wish it to be understood that I do not desire to be limited to the exact details of temperatures, percentages of constituents and operation above described, for obvious modifications will occur to a person skilled in the art.

I claim:—

1. As a new article of manufacture grey iron, wherein the free carbon is distributed in the fine state of division characteristic of the eutectic graphite.

2. The process of producing grey iron comprising melting iron having a high silicon content and cooling same rapidly by casting it in an iron mould.

3. The process of producing grey iron comprising melting iron having a silicon content of about 3.5% and cooling same rapidly by casting same in an iron mould.

4. The process of producing grey iron comprising melting iron having a high silicon content and rapidly cooling the same, the silicon content being chosen in proportion to the chosen rate of cooling.

5. The process of producing grey iron comprising melting iron having a high silicon content and rapidly cooling the same, the silicon content being chosen in proportion to the chosen rate of cooling and to other constituents adapted to influence the formation of graphite.

6. In the process of producing grey iron by melting iron having a high silicon content and thereafter cooling same, the step of arranging for definite relation between the grade of iron and the rate of cooling so that the pressure exerted on the carbon by ingredients which favour graphite formation is greater than the effect of ingredients which retard the formation of graphite.

In testimony whereof I affix my signature.

EMIL SCHÜZ.